July 10, 1956  H. BAUMGARTNER  2,753,850
WINDSHIELD WIPER WITH PNEUMATIC DRIVE
Filed July 29, 1952  2 Sheets-Sheet 1
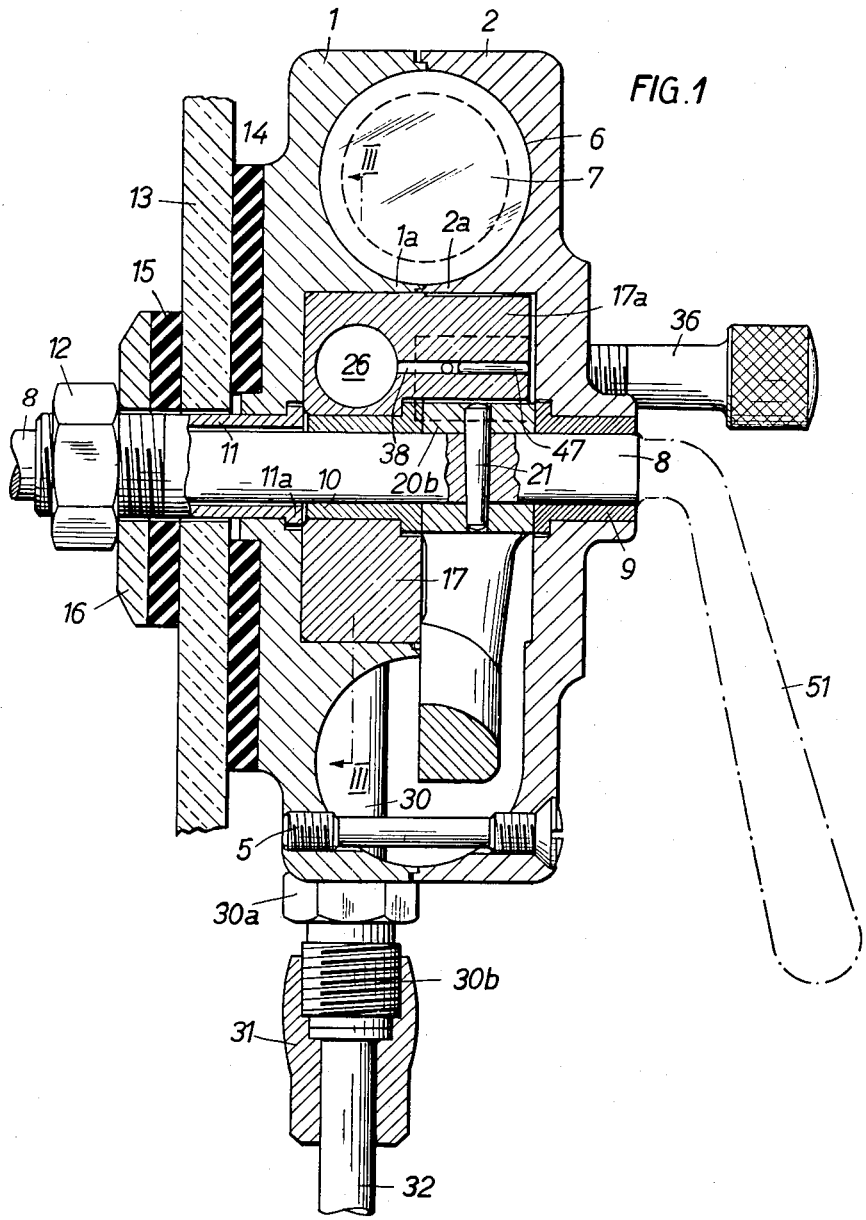
INVENTOR:
HANS BAUMGARTNER

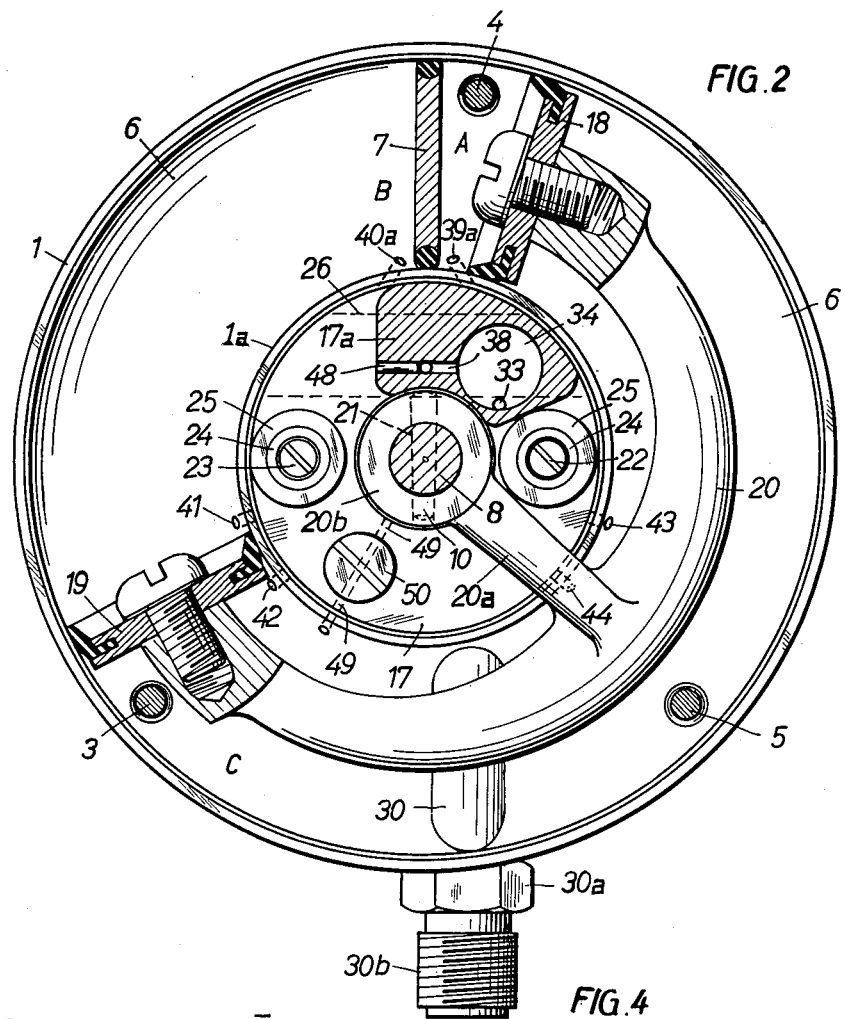

United States Patent Office

2,753,850
Patented July 10, 1956

2,753,850

WINDSHIELD WIPER WITH PNEUMATIC DRIVE

Hans Baumgartner, Zollikon, near Zurich, Switzerland

Application July 29, 1952, Serial No. 301,506

Claims priority, application Switzerland July 30, 1951

8 Claims. (Cl. 121—97)

This invention relates to windshield wipers and more particularly to windshield wipers equipped with a pneumatic drive.

There are windshield wipers known for automobiles with a shaft carrying the wiper arm, to which shaft there is imparted a to-and-fro rocking motion by a double piston linearly reciprocated by means of a pneumatic drive. The required conversion of the linear piston motion into a rocking motion of the wiper shaft makes the manufacturing of the windshield wiper comparatively complicated, space requiring and expensive.

It is an object of my present invention to provide a pneumatically driven windshield wiper having a simple driving arrangement and a reduced number of motion transmitting elements and other efficacious structural parts, so that the whole wiper drive arrangement is formed as a comparatively small and compact unit of an esthetically appealing form.

A further object of the invention is to provide means contributing to a wiper of the aforesaid type, whose structure requires moderate manufacturing costs while nonetheless ensures a very efficient and reliable operation of the windshield wiper.

The invention is more specifically directed to a pneumatically driven windshield wiper having a casing which forms a circular guide path for a double piston connected with the wiper shaft, said pistons being alternately supplied with compressed air through an automatic control member in such a manner that the piston arrangement performs a reciprocating motion.

The two pistons of said double-piston arrangement are suitably provided on a segment which by means of a radial support arm is secured directly to the wiper shaft.

The invention is more fully disclosed in the following specification of which the accompanying drawings form a part and disclose an embodiment of the invention given merely as one of many possible examples, and in which:

Fig. 1 is an axial section through the shaft of the wiper drive;

Fig. 2 shows in elevation and partly in section one of the halves of the two-piece casing with the parts mounted therein;

Fig. 3 is a partial section taken along the line III—III in Fig. 1, and

Fig. 4 is a partial section taken along the line IV—IV in Fig. 3.

Referring now more particularly to the drawings there are illustrated two cylindrical casing halves 1 and 2, which according to Fig. 2 are axially connected together by three screws 3, 4 and 5. In Fig. 1 the connection screw 5 is shown displaced with respect to Fig. 2, in order to simplify the manner of illustration. The two casing halves 1 and 2 form together an annular cylinder 6, which is interrupted by an inserted radial partition wall 7, and which is of circular cross-section extending approximately in an arc from screw 3, past screw 4, to screw 5. This cross-sectional shape is interrupted in the zone of the end-arc, extending somewhat beyond the angle enclosed by the two screws 3 and 5, as shown in Fig. 1. In order to form the circular cross-section of said cylinder 6 made up from said two casing halves 1 and 2, the latter have each an inner rim 1a and 2a, respectively; the rim 1a is continuous while the rim 2a is interrupted on its circumference, namely along that portion where the circular cross-section of the cylinder 6 ends. A central transverse boring of the casing 1, 2 receives the wiper shaft 8 traversing two bearing bushings 9 and 10 and a sleeve 11, the latter clearing said shaft, which sleeve by means of a flange 11a abuts against the casing half 1 and together with the threaded nut 12 serves to fasten the casing halves 1, 2 on the windshield panel 13. On both sides of the glass panel 13 resilient, intermediary discs 14 and 15 respectively, consisting preferably of rubber, bear against the panel; the intermediary disc 15 forms the support for an annular washer 16 associated with the nut 12. The wiper arm (not shown) for the glass panel 13 is secured on a corresponding extension of the shaft 8.

A control body located within the assembled casing 1, 2 is inserted with its disc-shaped part 17 into a corresponding concentrical recess of the casing half 1 and is mounted on the mentioned bearing bushing 10, while a lateral projection 17a of said part 17 is received by the casing half 2. In that part of the cylinders 6 forming a motion track of circular cross-section, there move two pistons 18 and 19 forming the ends of an oscillatory body constituted by a segment 20 with a radial supporting arm 20a, which arm by means of a hub 20b rests directly upon the shaft 8 and is secured to it by a cotter pin 21. The stroke of the pistons of said oscillating body 20 is limited by two stops for abutment against arm 20a, which stops are formed by two screws 22 and 23 each provided with a sleeve 24 carrying a rubber cover 25, whereby a gentle or soft striking abutment for arm 20a is assured. The said two screws 22 and 23 serve also to fasten the control body 17, 17a to the casing half 1; on their respective head portion projecting from the free face of the part 17 the screws 22 and 23 carry the associated sleeves 24 with rubber covers 25.

A bore or passageway 26 extends transversely to the wiper shaft 8 in part 17 of the control body (Fig. 1), in which bore the automatic reversing member 27 (Fig. 3) is located. At its two ends the member 27 is provided with pistons 28 and 29, thus acting as a double-piston (said reversing member 27 being omitted in Figs. 1, 2 and 4). To the control body part 17 a nipple 30 is screwed, which on its portion outside of the casing half 1 has a hexagon head 30a and ends in a threaded portion 30b, for receiving according to Fig. 1 a nut 31 by means of which a pipe 32 is connected with the nipple 30, said pipe supplying compressed air serving for the operation of the oscillatory body 20 and thus of the wiper arm of the windshield wiper (not shown). From said nipple 30 according to Figs. 3 and 4 a duct 33 leads into a chamber 34 provided in the control body part 17a, said chamber containing a piston valve 35 which is adjustable by means of an outer knurled pin 36 inserted in a threaded opening 37 of the casing half 2. From said chamber 34 an intermediary duct 38 angled off and controlled by the piston valve 35 leads to the mentioned transverse and linearly extending bore or passageway 26, said intermediary duct 38 opening into the transverse bore 26 on the portion between the two pistons 28 and 29 of the reciprocable reversing member 27; numerals 47 and 48 (Figs. 1 and 2) represent two closing pins provided in the zone of the intermediary duct 38. From the transverse bore 26 according to Fig. 3 two upper channels 39 and 40 branch off, the second opening of which indicated in Fig. 2 with 39a and 40a, respectively, is situated on the free outer face of the rim 1a, provided in the casing half 1. Transversely or radially extending ducts 41, 42, 43 and 44 terminate at the free outer face of the rim 1a comprising the part 17 of the control body. The radial ducts 41 and 42 start from a groove 45 (Fig. 3) provided on the circumference of the control body member 17 and connected with its transverse bore 26, while the radial ducts 43 and 44 are connected with a groove 46, being similar to groove 45 and lying opposite to it on the circumference of the control body member 17. In the latter, moreover, a radial duct 49 is provided which is controlled by an adjustment screw 50 and the outer opening of same is also located on the outer face of said rim 1a, while the inner opening of said duct is connected with the intermediary space present due to the clearance provided between the wiper shaft 8 and the fastening sleeve 11.

In order to put the above described windshield wiper in operation by means of the knurled pin 36, the piston valve 35 arranged in the chamber 34 of the control body part 17a is retracted or moved back from its blocked position, so that the intermediary duct 38 (Figs. 3, 4) comes in connection with said chamber 34. Then compressed air supplied to the nipple 30 streams from the chamber 34 through the intermediary channel 38 to the space of the transverse bore 26, provided between the two pistons 28 and 29 of the reversing or reciprocating member 27, and then through the upper channel 39, and through its opening 39a (Fig. 2), so that air enters the relatively small space A of the annular cylinder space 6 provided between the radial wall 7 and the piston 18 of the oscillating body 20, whereby the latter, the shaft 8, and the wiper arm (not shown) start to move in clockwise direction; by means of the mentioned piston valve 35 the supply of compressed air for the oscillatory piston 18 and accordingly the speed of oscillation of the wiper arm can be regulated. From the space B of the annular cylinder 6, provided between the radial wall 7 and the piston 19 the air escapes through the opening 40a of the upper duct 40 provided in the part 17 of the control body, through the corresponding free space of the transverse bore 26 and by way of the groove 45 of the control body part 17 and the narrow radial duct 42 enters the space C provided in the cylinder 6 between the two pistons 19 and 18, when the piston 19 passes the opening of the radial duct 41, being wider in comparison with duct 42, whereby compressing of the air escaping from the space B is prevented. The air escapes from the space C through the radial duct 49 of the control body member 17, in order to discharge into the open through the interspace between the wiper shaft 8 and the fastening sleeve 11 (Fig. 1). Subsequently, namely when the oscillating piston 19 has released the further radial duct 41, the air escaping from the space B leaves the groove 45 of the control body member 17 and through the radial duct 41 enters the space C of the cylinder 6.

The clockwise oscillating stroke of the wiper shaft 8 lasts until the piston 18 has passed the radial duct 43, whereby the compressed air supplied to the space A escapes through this radial duct 43 and the groove 46 provided on the control body part 17 to the transverse bore 26; the result is that the reversing member 27 is moved out of the end position shown in Fig. 3 into the opposite position. Then by means of the piston 29 of the reversing member 27 the upper duct 39 of the control body member 17 is blocked, while now the space of the transverse bore 26 of said member 17 located between the two pistons 28 and 29 of the reversing member 27 is situated in the zone of the upper duct 40 of the member 17. The compressed air streaming into said bore space through the intermediary duct 38 takes now its way through the mentioned upper duct 40 and through the opening 40a of it comes to the now comparatively reduced portion of the space B of the cylinder 6, which is left between the then displaced oscillating piston 19 and the radial wall 7. Consequently the body 20 now swings back to its starting position rotating the wiper shaft 8 accordingly, the function of the radial ducts 42 and 41 described at the preceding rocking suction of the body 20 being assigned to the radial ducts 44 and 43. When the oscillating body 20 has reached approximately the starting position, the automatic shifting of the reversing member to its starting position is brought about accordingly, whereupon body 20 is again rotated in clockwise direction, etc., until by means of the knurled pin 36 the piston valve 35 is so adjusted that the connection of the intermediary duct 38 with the air chamber 34 of the control body member 17a is interrupted, whereupon the propulsion, and consequently the movement, of the oscillatory body 20 stops.

The wiper shaft 8, as indicated in Fig. 1 by dot and dash lines, is provided with a handle 51 in order to facilitate operation by hand, if necessary. This handle 51 preferably is rigidly secured to the wiper shaft 8, but may be formed as slip-on handle.

The invention may be carried out in other specific ways than those herein set forth without departing from the spirit and essential characteristics of the invention and the present embodiment is, therefore, to be considered as illustrative and not restrictive, and all changes coming within the meaning and equivalency range of the appended claims are intended to be embraced therein.

Having thus described the invention, what I claim as new and desired to be obtained by Letters Patent, is:

1. A pneumatic motor for driving a shaft of a windshield wiper comprising a housing divided perpendicular to the axis of said wiper shaft to thereby obtain two housing halves providing therebetween an arc-shaped cylindrical space, one of said housing halves having an inner circular rim, a radial partition in said cylindrical space and dividing the latter, an oscillatable, arcuately shaped body terminating in respective piston means operating within said cylindrical space, said arcuate body being radially connected to said wiper shaft, a control body secured to said housing and located concentrically to said wiper shaft, said control body including a passageway and being formed to regulate air discharge onto said pistons, respectively, a disc-shaped part, a lateral projection on said control body, said disc-shaped part of said control body being circumferentially enclosed by said circular rim of said one housing half, said lateral projection extending into the other half of said housing, a linearly moving reciprocable member located within said passageway of said control body by means of which compressed air supplied to said control body is conducted to said pistons respectively, whereby the arcuate body is put in reciprocating motion, said lateral projection of said control body including an air chamber, and a control and turn-off valve for a channel positioned intermediate said air chamber and said linearly moving member, whereby supply of air to said pistons respectively, is caused by opening said valve and the establishment of connection of said air chamber through said channel with said passageway and displacement of said reciprocable member in the latter.

2. A pneumatic motor for driving a shaft of a windshield wiper according to claim 1, wherein said disc-shaped part of the control body has a boring extending transversely to the wiper shaft, in which the linearly moving member formed as a double-piston is arranged, and which boring can be connected with said air chamber through an intermediary duct by means of corresponding adjustment of the control and turn-off valve.

3. A pneumatic motor for driving a shaft of a windshield wiper according to claim 1, wherein the disc-shaped part of the control body is provided with a nipple serving for the supply of compressed air to said air chamber, which nipple also serves to prevent turning of said control body within said housing.

4. Pneumatically operated drive means for the shaft of a windshield wiper; comprising a casing composed of two halves, said half casings defining in assembled condition a substantially annular space therein, a radially extending partition dividing said space, an oscillatory body movable in said space with respect to said partition and provided at its ends with respective piston means and with an arm interconnecting said shaft with said oscillatory body, a control body housed in a recess provided in said one half casing, a passageway provided in said control body, channel means providing communication between said space and said passageway, a reversing member reciprocable in said passageway for alternately regulating streams of compressed air through said channel means to said space for operating said piston means, respectively, whereby said oscillatory body is moved to and fro in said space for oscillating said shaft, a lateral projection extending from said control body into the other casing half and provided with a chamber for receiving compressed air, duct means establishing communication between said chamber and said passageway, and valve means operable in said chamber and actuatable from therewithout, said valve means regulating communication between said chamber and said passageway, whereby the oscillation of said shaft is controlled.

5. Pneumatically operated drive means according to claim 4, wherein said control body is disc-shaped and concentrically disposed about said shaft, said passageway extending through said control body in transverse direction to said shaft.

6. Pneumatically operated drive means according to claim 5, wherein said disc-shaped control body is provided with a nipple communicating with said air chamber of said lateral projection, said nipple serving to supply compressed air to said chamber for operating said shaft and simultaneously serving to retain said control body against displacement.

7. Pneumatically operated drive means for the shaft of a windshield wiper; comprising a casing composed of two halves, said half casings defining in assembled condition a substantially arcuate space therein, a radially extending partition dividing said space, an oscillatory body movable in said space with respect to said partition and provided at its ends with respective piston means and with an arm fixed to said shaft, a control body housed in a recess concentrically provided in said one half casing, a linearly extending passageway provided in said control body, spaced channel means establishing communication between said passageway and said space, a reciprocable member in said passageway for alternately regulating streams of compressed air through said channel means, respectively, to said space for operating said piston means, whereby said oscillatory body is moved to and fro in said space for oscillating said shaft, a lateral projection extending from said control body into the other casing half and provided with a chamber for receiving compressed air, valve means operable in said chamber and actuatable from therewithout, said chamber communicating with said passageway, and duct means operable by said valve means and interconnecting said chamber and said passageway for regulating communication therebetween.

8. Drive means for the shaft of a windshield wiper; comprising a casing composed of two halves, the line of contact of said two half casings extending perpendicularly to the axis of said shaft, said half casings defining in assembled condition a substantially annular space therein, a radially extending partition dividing said space, an oscillatory body movable in said annular space with respect to said partition and with an arm interconnecting said shaft with said oscillatory body, a control body disposed about said shaft and housed in a recess concentrically provided in said casing, a linearly extending passageway provided in said control body, a pair of channel means establishing communication between said passageway and said space, a reciprocable member in said passageway, said reciprocable member being provided with faces engageable with said channel means for alternately regulating streams of compressed air through said channel means into said space for operating said piston means, respectively, whereby said oscillatory body is moved to and fro in said space for oscillating said shaft, and means controlling supply of compressed air to said passageway and extending from without said casing into said control body, whereby the latter is encompassed by said annular space.

References Cited in the file of this patent

UNITED STATES PATENTS

| | | |
|---|---|---|
| 949,901 | Janik | Feb. 22, 1910 |
| 1,006,157 | Weber et al. | Oct. 17, 1911 |
| 1,145,449 | Walker | July 6, 1915 |
| 1,442,540 | Ross | Jan. 16, 1923 |
| 1,674,056 | Oishei et al. | June 19, 1928 |
| 1,709,682 | Moxley | Apr. 16, 1929 |
| 1,956,520 | Weidman | Apr. 24, 1934 |
| 2,257,534 | Renwick | Sept. 30, 1941 |
| 2,561,858 | Granowski | July 24, 1951 |

FOREIGN PATENTS

| | | |
|---|---|---|
| 20,702 | Austria | July 25, 1905 |
| 30,795 | Switzerland | Oct. 29, 1907 |
| 208,413 | Switzerland | Apr. 16, 1940 |